(12) United States Patent
Araki et al.

(10) Patent No.: US 8,784,600 B2
(45) Date of Patent: Jul. 22, 2014

(54) METHOD FOR ADHERING GLASS

(75) Inventors: Kiminori Araki, Hiratsuka (JP); Hiroshi Fukui, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 41 days.

(21) Appl. No.: 13/230,598

(22) Filed: Sep. 12, 2011

(65) Prior Publication Data

US 2012/0061020 A1    Mar. 15, 2012

(30) Foreign Application Priority Data

Sep. 14, 2010  (JP) ................. 2010-206058

(51) Int. Cl.
| | |
|---|---|
| B29C 65/00 | (2006.01) |
| B32B 37/00 | (2006.01) |
| B32B 38/00 | (2006.01) |
| B31B 1/60 | (2006.01) |
| B60J 1/00 | (2006.01) |
| E06B 3/00 | (2006.01) |
| E06B 5/00 | (2006.01) |
| E06B 7/00 | (2006.01) |
| C09J 5/04 | (2006.01) |
| B32B 27/00 | (2006.01) |
| C09J 7/02 | (2006.01) |
| D06M 15/643 | (2006.01) |
| C04B 28/36 | (2006.01) |
| C09D 4/00 | (2006.01) |
| C09D 101/00 | (2006.01) |
| C09D 201/00 | (2006.01) |
| C07F 7/18 | (2006.01) |
| C09D 183/04 | (2006.01) |
| C08K 5/54 | (2006.01) |
| C03C 23/00 | (2006.01) |
| C03C 17/34 | (2006.01) |

(52) U.S. Cl.
CPC ......... *C03C 17/3405* (2013.01); *C03C 23/0075* (2013.01); *C03C 2218/31* (2013.01)
USPC ............. 156/281; 156/60; 156/108; 156/314; 156/315; 156/331.7; 156/329; 106/287.11; 106/287.23; 106/285; 106/287.13; 106/287.16; 106/287.32; 524/188

(58) Field of Classification Search
USPC ........ 156/281, 60, 108, 314, 315, 331.7, 329; 106/287.11, 287.23, 285, 287.13, 106/287.16, 287.32; 524/188
See application file for complete search history.

(56) References Cited

U.S. PATENT DOCUMENTS 4,857,366 A * 8/1989 Schumacher ............... 427/302
6,041,976 A * 3/2000 Robertson .................... 222/333

(Continued)

FOREIGN PATENT DOCUMENTS

JP    H01-274872    11/1989

(Continued)

OTHER PUBLICATIONS

Japanese Office Action dated Dec. 17, 2013, 3 pages, Japan.

*Primary Examiner* — Matthew Daniels
*Assistant Examiner* — Matthew Hoover
(74) *Attorney, Agent, or Firm* — Thorpe North & Western LLP

(57) ABSTRACT

A method for adhering glass including cleaning ceramic printed glass using a first solution containing dodecylbenzenesulfonic acid, p-toluenesulfonic acid, and a solvent, and cleaning the glass using a second solution containing an alkoxysilane compound. Thereafter, a glass primer is applied to the glass, an adhesive is applied, and the glass is adhered to an adherend. The first solution includes not less than 0.1 mass % and not more than 10 mass % of the dodecylbenzenesulfonic acid, and not less than 0.01 mass % and not more than 5 mass % of the p-toluenesulfonic acid, per 100 mass % of the solvent.

20 Claims, 1 Drawing Sheet

(56) References Cited

U.S. PATENT DOCUMENTS

| | | | |
|---|---|---|---|
| 6,053,971 A * | 4/2000 | Lin | 106/287.23 |
| 6,239,098 B1 * | 5/2001 | Matsumura et al. | 510/466 |
| 7,494,540 B2 * | 2/2009 | Wu et al. | 106/287.11 |
| 7,708,853 B2 | 5/2010 | Wu et al. | |
| 7,931,773 B2 | 4/2011 | Mahdi et al. | |
| 2009/0061633 A1 * | 3/2009 | Nakata et al. | 438/694 |

FOREIGN PATENT DOCUMENTS

| | | |
|---|---|---|
| JP | 09-310094 | 12/1997 |
| JP | 10-060310 | 3/1998 |
| JP | 2010-506008 | 2/2010 |

\* cited by examiner

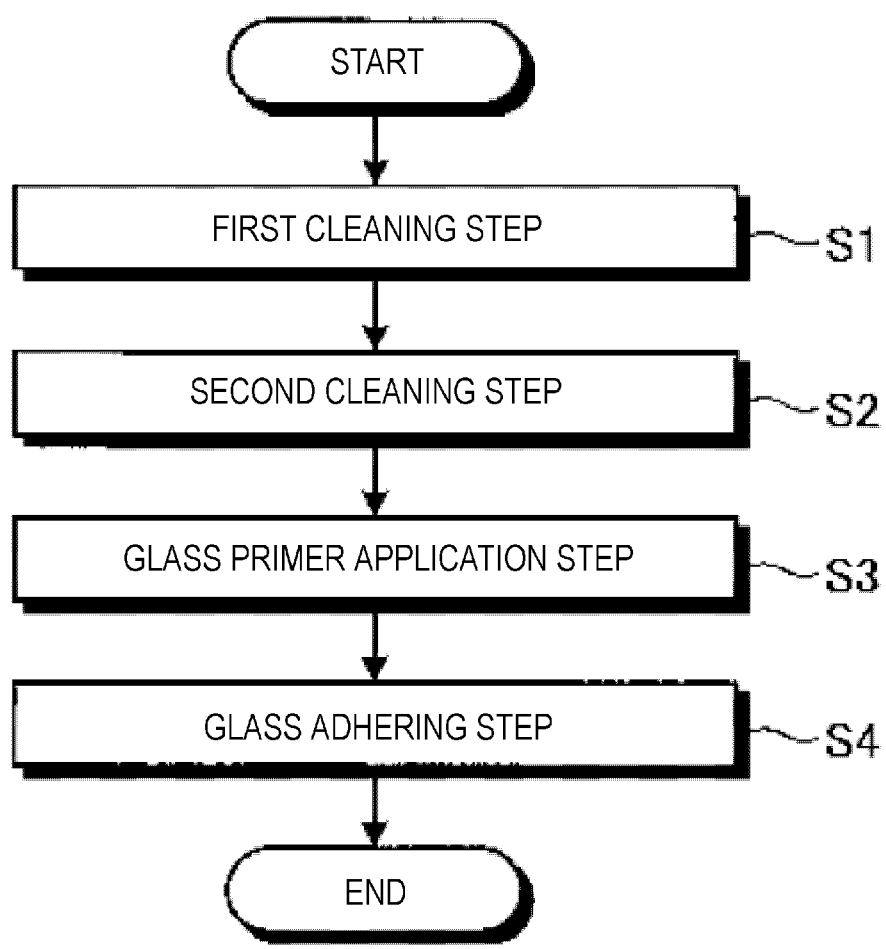

METHOD FOR ADHERING GLASS

PRIORITY CLAIM

Priority is claimed to Japan Patent Application Serial No. 2010-206058 filed on Sep. 14, 2010.

BACKGROUND

1. Technical Field

The present technology relates to a method for adhering glass.

2. Related Art

Conventionally, methods of mechanically abrading using a scouring brush or the like, and methods of chemically abrading using a specific cleaning agent have been used as methods for cleaning window glass, mirrors, and painted surfaces of vehicles, boats and ships, aircraft, buildings, and the like.

For example, Japanese Unexamined Patent Application No. H09-310094A describes a water repellent cleanser including a water-soluble cohydrolytic condensation product of an amino group-containing alkoxysilane with a fluorinated alkyl group-containing alkoxysilane or with the fluorinated alkyl group-containing alkoxysilane and a monovalent fluorine-free hydrocarbon group-containing alkoxysilane as an active ingredient. According to Japanese Unexamined Patent Application No. H09-310094A, this water repellent cleanser simultaneously delivers a cleansing effect and high water repellency. Additionally, durability of the water-repelling film and solution preservability are excellent and corrosivity is low. Such a water repellent cleanser is described as being especially useful as a water repellent window washing solution for automobiles.

However, when only cleaning using the water repellent cleanser having an alkoxysilane compound as an active ingredient, as described in Japanese Unexamined Patent Application No. H09-310094A, there are problems such as ceramic printed glass such as that used for the front glass of automobiles cannot be sufficiently cleaned and the glass, after being cleaned, does not sufficiently adhere to the vehicle body. Particularly, because glass that is to be adhered to a vehicle body is stored for a given period of time in a warehouse, or the like, paper scorching may occur where chemicals included in paper used to package the glass for protection migrate to the glass side. When cleaned using only the water repellent cleanser described above, the cleansing power obtained was not sufficient and the glass did not sufficiently adhere to the vehicle body after being cleaned.

SUMMARY

The present technology provides a method for adhering glass having enhanced adhesive strength to an adherend. The present inventors conducted diligent research into means for solving the problems described above and arrived at the following technology. The present technology is described in 1 to 3 below.

1. A method for adhering glass including a first cleaning step wherein ceramic printed glass is cleaned using a first solution containing dodecylbenzenesulfonic acid, p-toluenesulfonic acid, and a solvent; a second cleaning step wherein the glass cleaned using the first solution is cleaned using a second solution containing an alkoxysilane compound; a glass primer application step wherein a glass primer is applied to the glass cleaned using the first solution and the second solution; and a glass adhering step wherein an adhesive is applied to the glass after the glass primer has been applied, and the glass to which the adhesive has been applied is adhered to an adherend.

The first solution includes not less than 0.1 mass % and not more than 10 mass % of the dodecylbenzenesulfonic acid, and not less than 0.01 mass % and not more than 5 mass % of the p-toluenesulfonic acid, per 100 mass % of the solvent.

2. The method for adhering glass described in 1, wherein the alkoxysilane compound contains at least one of an imino group, an amino group, and a mercapto group.

3. The method for adhering glass described in 1, wherein the alkoxysilane compound is dimethylphenyl methoxysilane.

According to the method for adhering glass of the present technology, an enhancement in the adhesive strength to an adherend can be provided.

BRIEF DESCRIPTION OF THE DRAWING

FIG. 1 is a flowchart illustrating the steps of the method for adhering glass of this embodiment.

DETAILED DESCRIPTION

The present technology is described in detail below while referring to the drawings. However, the present technology is not limited by this description. Furthermore, the constituents described below include constituents that could be easily conceived by a person skilled in the art and constituents that are essentially identical, or, in other words, are equivalent in scope. Additionally, the configurations described below can be combined as desired.

FIG. 1 is a flowchart illustrating the steps of the method for adhering glass of this embodiment. The method for adhering glass of this embodiment includes a first cleaning step wherein ceramic printed glass is cleaned using a first solution containing dodecylbenzenesulfonic acid, p-toluenesulfonic acid, and a solvent (step S1); a second cleaning step wherein the glass cleaned using the first solution is cleaned using a second solution containing an alkoxysilane compound (step S2); a glass primer application step wherein a glass primer is applied to the glass cleaned using the first solution and the second solution (step S3); and a glass adhering step wherein an adhesive is applied to the glass after the glass primer has been applied, and the glass to which the adhesive has been applied is adhered to an adherend (step S4).

The step S1 is a step wherein ceramic printed glass is cleaned using a first solution containing dodecylbenzenesulfonic acid, p-toluenesulfonic acid, and a solvent. In this embodiment, the glass to be adhered is ceramic printed glass (referred to hereinafter as "cera-glass" as necessary). "Cera-glass" refers to float plate glass that, for example, has a ceramic coating screen printed on a surface thereof and, thereafter is heat treated to make the coating permanent. Cera-glass is strengthened by the heat treating process and, therefore, is used as front glass in automobiles and the like because of superior wind blast strength, impact strength, heat cracking resistance, and the like.

The first solution is a solution containing dodecylbenzenesulfonic acid (DBSA), p-toluenesulfonic acid (PTSA), and a solvent. DBSA and PTSA are both organic compounds that contain sulfo groups. Combining these organic compounds is superior to using another organic compound that has a sulfo group, because with the combination of these organic compounds, dirt and oil can be removed from the cera-glass, and this leads to an enhancement in the adhesive strength of the adhesive, which is described hereinafter.

As long as the first solution contains DBSA and PTSA, it may also contain an organic compound (sulfonic acid compound) that has a sulfo group described below. Specifically, the first solution can include an alkyl aromatic sulfonic acid such as tridecylbenzenesulfonic acid, tetradecylbenzenesulfonic acid, dodecyltoluene sulfonic acid, and the like; and a sulfonic acid that contains a functional group, other than a sulfo group, such as a hydroxy group or an amino group, such as p-phenolsulfonic acid, cresolsulfonic acid, and the like. Along with the DBSA and the PTSA, this sulfonic acid compound can be used alone or in a combination of two or more.

The solvent is a volatile solvent in which sulfonic acid compounds such as DBSA, PTSA, and the like are soluble, and which is inert with respect to sulfonic acid compounds. Examples that can be used as the solvent include alcohols such as isopropyl alcohol (IPA), methanol, and ethanol; aromatic hydrocarbon compounds such as benzene, xylene, toluene, and the like; aliphatic hydrocarbon compounds such as n-hexane and the like; ketones such as acetone, methyl ethyl ketone (MEK), methyl isobutyl ketone, and the like; esters such as methyl acetate, ethyl acetate, butyl acetate, and the like; ethers such as diethylether, tetrahydrofuran, dioxane, and the like; and white gasoline. Among these, isopropyl alcohol (IPA), n-hexane, and methyl ethyl ketone (MEK) are preferable due to high solubility and volatility.

The first solution can contain water. Water has both volatile properties whereby the sulfonic acid compounds such as DBSA, PTSA, and the like are soluble, and properties that are inert with respect to the sulfonic acid compounds, the same as the solvent.

A content of the DBSA contained in the first solution is preferably not less than 0.1 mass % and not more than 10 mass %, and more preferably not less than 0.5 mass % and not more than 1.5 mass % per 100 mass % of the solvent. When the content of the DBSA in the first solution is within this range, detergency of cera-glass can be sufficiently enhanced and adhesive strength of the adhesive described hereinafter can be sufficiently enhanced. Additionally, stickiness of the cera-glass surface after cleaning can be suppressed, which leads to the accumulation of dust and the like on the cera-glass surface being suppressed. Therefore, a clean state of the cera-glass surface can be preserved. It is not preferable that the content of the DBSA in the first solution be below 0.1 mass % per 100 mass % of the solvent, because cleaning of the cera-glass will be insufficient, and adhesive strength of the adhesive described hereinafter cannot be sufficiently enhanced. Likewise, it is not preferable that the content of the DBSA in the first solution exceed 10 mass % per 100 mass % of the solvent, because after cleaning the cera-glass surface will be sticky and dust and the like will accumulate on the cera-glass surface. This will lead to not being able to preserve the clean state of the cera-glass surface.

A content of the PTSA contained in the first solution is preferably not less than 0.01 mass % and not more than 5 mass %, and more preferably not less than 0.1 mass % and not more than 0.7 mass % per 100 mass % of the solvent. When the content of the PTSA in the first solution is within this range, detergency of cera-glass can be sufficiently enhanced and adhesive strength of the adhesive described hereinafter can be sufficiently enhanced. Additionally, formation of a powdery oxidation coating on the cera-glass surface after cleaning can be suppressed. Therefore, a clean state of the cera-glass surface can be preserved. It is not preferable that the content of the PTSA in the first solution be below 0.01 mass % per 100 mass % of the solvent, because cleaning of the cera-glass will be insufficient, and adhesive strength of the adhesive described hereinafter will decrease. Likewise, it is not preferable that the content of the PTSA in the first solution exceed 5 mass % per 100 mass % of the solvent, because a powdery oxidation coating will form on the cera-glass surface after cleaning. This will lead to the clean state of the cera-glass surface being not able to be preserved.

The first solution can also contain additives described below that are conventionally used in surface treating agents. Examples of the additives include polyisocyanate compounds, silane coupling agents, catalysts, resins, fillers, colorants, drying agents, and the like.

It is sufficient that the polyisocyanate compound be a compound that has an isocyanate group at an end thereof. Examples thereof include aromatic polyisocyanates such as 2,4-tolylene diisocyanate, 2,6-tolylene diisocyanate, 4,4'-diphenylmethane diisocyanate, 2,4'-diphenylmethane diisocyanate, p-phenylene diisocyanate, polymethylene polyphenylene polyisocyanate, and the like; aliphatic polyisocyanates such as hexamethylene disocyanate and the like; alicyclic polyisocyanates such as isophorone diisocyanate and the like; aryl aliphatic polyisocyanates such as xylylene diisocyanate and the like; carbodiimide-modified or isocyanurate-modified polyisocyanates of the polyisocyanates described above; and the like. A single polyisocyanate compound can be used or a combination of two or more polyisocyanate compounds can be used.

Examples of the silane coupling agent include chloropropyltrimethoxysilane, vinyltrichlorosilane, vinyltriethoxysilane, vinyl tris(2-methoxyethoxy)silane, γ-methacryloxypropyltrimethoxysilane, β-(3,4-epoxycyclohexyl) ethyltrimethoxysilane, γ-glycidoxypropyltrimethoxysilane, γ-mercaptopropyltrimethoxysilane, aminopropyltriethoxysilane, N-β(aminoethyl)γ-aminopropyltrimethoxysilane, γ-ureidopropyltriethoxysilane, and the like.

Examples of the catalyst include amine-based catalysts such as triethylenediamine, pentamethyldiethylentriamine, morpholine amines, triethylamines, and the like; tin-based catalysts such as dilaurate-di-n-octyltin, dibutyltin dilaurate, tinocto ate, and the like; and the like.

Examples of the resin include urethane resins such as polyester polyurethane resin, polyether polyurethane resin; polyester resins; and the like.

Examples of the filler include calcium carbonate, carbon black, clay, talc, silica, diatomite, and fatty acid or fatty ester treated products thereof.

Examples of the colorant include titanium white, carbon black, and the like.

Examples of the drying agent include synthetic zeolite and the like.

A method of preparing the first solution is not particularly limited. Examples thereof include a preparation method wherein the dodecylbenzenesulfonic acid, the p-toluenesulfonic acid, the solvent, and the additives that can be used as necessary are blended.

A method of cleaning the cera-glass using the first solution is not particularly limited. A suitable method can be selected. Examples thereof include immersing the cera-glass in the first solution, dripping the first solution on the cera-glass using a dropper, and wiping the surface of the cera-glass with gauze or the like.

In the step S1, the cera-glass is cleaned using the DBSA, the PTSA, and the solvent as described above. The detergency effectiveness on the cera-glass can be dramatically enhanced by combining the step S1 and the second cleaning step (step S2) described hereinafter. The step S2 is performed after the cera-glass is cleaned with the first solution.

The step S2 is a step wherein the glass cleaned using the first solution is cleaned using a second solution containing an alkoxysilane compound. In the step S2, the glass cleaned in the step S1 is further cleaned, which leads to a state where an adhesive described hereinafter can be applied more favorably to the surface of the cera-glass.

The alkoxysilane compound is an organic compound wherein an alcohol is bonded to silicon. The alkoxysilane compound contained in the second solution is not particularly limited. The alkoxysilane compound contained in the second solution preferably contains at least one selected from an imino group (NH group), an amino group (NH$_2$ group), and a mercapto group (SH group). These functional groups primer react because the alkoxysilane compound contained in the second solution contains at least one selected from an imino group (NH group), an amino group (NH$_2$ group), and a mercapto group (SH group) and, therefore, adhesive strength can be further enhanced.

Examples of the imino group-containing alkoxysilane include 3-(1-hexamethyleneimino)propyl(triethoxy)silane, 3-(1-hexamethyleneimino)propyl(trimethoxy)silane, (1-hexamethyleneimino)methyl(trimethoxy)silane, (1-hexamethyleneimino)methyl(triethoxy)silane, 2-(1-hexamethyleneimino)ethyl(triethoxy)silane, 2-(1-hexamethyleneimino)ethyl(trimethoxy)silane, 3-(1-pyrrolidinyl)propyl(triethoxy)silane, 3-(1-pyrrolidinyl)propyl(trimethoxy)silane, 3-(1-heptamethyleneimino)propyl(triethoxy)silane, 3-(1-dodecamethyleneimino)propyl(triethoxy)silane, 3-(1-hexamethyleneimino)propyl(diethoxy)methylsilane, 3-(1-hexamethyleneimino)propyl(diethoxy)ethylsilane, N-(1,3-dimethylbutylidene)-3-(triethoxysilyl)-1-propanamine, N-(1-methylethylidene)-3-(triethoxysilyl)-1-propanamine, N-ethylidene-3-(triethoxysilyl)-1-propanamine, N-(1-methylpropylidene)-3-(triethoxysilyl)-1-propanamine, N-(4-N,N -dimethylaminobenzylidene)-3-(triethoxysilyl)-1-propanamine, N-(cyclohexylidene) -3-(triethoxysilyl)-1-propanamine, trimethoxysilyl compounds, methyldiethoxysilyl compounds, ethyldiethoxysilyl compounds, methyldimethoxysilyl compounds, and ethyldimethoxysilyl compounds corresponding to these triethoxysilyl compounds, 1-[3-(triethoxysilyl)propyl]-4,5-dihydroimidazole, 1-[3-(trimethoxysilyl)propyl]-4,5-dihydroimidazole, 3-[10-(triethoxysilyl)decyl]-4-oxazoline, 3-(1-hexamethyleneimino)propyl(triethoxy)silane, (1-hexamethyleneimino)methyl(trimethoxy)silane, N-(3-triethoxysilylpropyl)-4,5-dihydroimidazole, N-(3-iso-propoxysilylpropyl)-4,5-dihydroimidazole, N-(3-methyldiethoxysilylpropyl)-4,5-dihydroimidazole, and the like.

Examples of the amino group-containing alkoxysilane include 3-dimethylaminopropyl(triethoxy)silane, 3-dimethylaminopropyl(trimethoxy)silane, 3-diethylaminopropyl(triethoxy)silane, 3-diethylaminopropyl(trimethoxy)silane, 2-dimethylaminoethyl(triethoxy)silane, 2-dimethylaminoethyl(trimethoxy)silane, 3-dimethylaminopropyl(diethoxy)methylsilane, 3-dibutylaminopropyl(triethoxy)silane, 3-aminopropyltrimethoxysilane, 3-aminopropyltriethoxysilane, aminophenyltrimethoxysilane, aminophenyltriethoxysilane, 3-(N -methylamino)propyltrimethoxysilane, 3-(N-methylamino)propyltriethoxysilane, and the like.

Examples of mercapto group-containing alkoxysilane compounds include 3-mercaptopropyltriethoxysilane, 3-mercaptopropyltrimethoxysilane, 2-mercaptoethyltriethoxysilane, 2-mercaptoethyltrimethoxysilane, 3-mercaptopropyl(diethoxy)methylsilane, 3-mercaptopropyl(monoethoxy)dimethylsilane, mercaptophenyltrimethoxysilane, mercaptophenyltriethoxysilane, and the like.

The alkoxysilane compound contained in the second solution is preferably dimethylphenyl methoxysilane. By including dimethylphenyl methoxysilane as the alkoxysilane compound in the second solution, adhesive strength with the primer described hereinafter can be further enhanced.

The second solution can also contain cleaning components described below that are conventionally used in surface treating agents in addition to at least the alkoxysilane compound. Examples of the cleaning components include various surfactants such as cationic, anionic, and nonionic surfactants. Examples of the cationic surfactant include tetraalkyl ammonium chlorides, imidazolinium methosulfates, and the like. Examples of the anionic surfactant include alkyl sulfates, alkyl ether sulfates, α-sulfo fatty acid methyl esters, α-olefin sulfonates, alkane sulfonates, alkylbenzene sulfonates, N-methyl-N-acyltaurines, and the like. Examples of the nonionic surfactant include primary alcohol ethoxylates, secondary alcohol ethoxylates, alkylphenyl polyoxyethylene ethers, fatty acid ethanolamides, amine oxides, and the like.

A content of the alkoxysilane compound in the second solution is preferably not less than 0.1 mass % and not more than 3 mass %. When the content of the alkoxysilane compound is within this range, the volatile effect can be sufficiently obtained and corrosion and staining of the cera-glass can be suppressed. If the content of the alkoxysilane compound is under 0.1 mass %, adhesive strength will decline. Additionally, if the content of the alkoxysilane compound exceeds 3 mass %, the storage stability of the solution will become prone to deterioration.

In addition to the alkoxysilane compound and the cleaning components, the second solution may also contain additives such as glycol and the like; solvents such as methanol, ethanol, and the like; metal anticorrosives; colorants; and the like.

Examples of second solutions including such components include known cleaning solutions such as commercially available vehicle washing solutions, shampoo solutions, and the like. The solvent may be the same solvent used in the first solution, but the solvent preferably contains an alcohol. Examples thereof include mixtures of MEK and IPA.

A method of preparing the second solution is not particularly limited. Examples thereof include a preparation method wherein the alkoxysilane compound and the cleaning component that can be used as necessary are blended.

A method of cleaning the cera-glass using the second solution is not particularly limited. A suitable method can be selected. Examples thereof include immersing the cera-glass in the second solution, dripping the second solution on the cera-glass using a dropper, brush application, and wiping the surface of the cera-glass with gauze or the like. The step S3 is performed after the cera-glass is cleaned with the second solution.

The step S3 is a step wherein a glass primer is applied to the glass cleaned using the first solution and the second solution. A conventional glass primer wherein an isocyanate compound is compounded in a silane-modified acrylic resin can be used as the glass primer.

The silane-modified acrylic resin is an acrylic resin modified by silane wherein a silicone bond has been introduced into the backbone of the acrylic resin and, for example, a resin wherein the acrylic backbone is modified by an alkoxysilane Si(OR)$_n$ can be used.

The isocyanate compound is not particularly limited, and examples thereof that can be used include 4,4'-diphenylmethane diisocyanate (MDI), tolylene diisocyanate (TDI), xylene diisocyanate (XDI), hexamethylene diisocyanate (HMDI), hydrogenated MDI, hydrogenated TDI, hydrogenated XDI, isophorone diisocyanate (IPDI), aromatic aliphatic polyisocyanate, aromatic polyisocyanate, triphenylmethane triisocyanate, tris-(p-isocyanate phenyl) thiophosphate, and mixtures of appropriate combinations thereof.

As necessary, other various solvents may be added to the glass primer. Solvents that can be used include those that are inert with respect to isocyanate groups. Examples thereof include ester-based solvents such as ethyl acetate, butyl acetate, and the like; ketone-based solvents such as methyl ethyl ketone (MEK), acetone, and the like; aromatic solvents such as toluene and the like; and the like. A method of preparing the glass primer is not particularly limited. Various methods by which the silane-modified acrylic resin, the isocyanate compound, and the solvent can be sufficiently mixed can be used in the preparation of the glass primer. For example, the glass primer can be prepared by blending the components using a bowl mill.

A method of applying the glass primer to the cera-glass is not particularly limited. A suitable method can be selected. Examples thereof include applying the glass primer to the cera-glass using a brush or the like, and applying by spraying. The step S4 is performed after the glass primer is applied to the cera-glass.

The step S4 is a step wherein an adhesive is applied to the glass after the glass primer has been applied, and the glass to which the adhesive has been applied is adhered to an adherend. Examples of adhesives that can be used include urethane-based adhesives. Specific examples include WS-100 (manufactured by The Yokohama Rubber Co., Ltd.), WS-222 (manufactured by The Yokohama Rubber Co., Ltd.), and the like, but the adhesive is not limited thereto.

A method of applying the adhesive is not particularly limited. A suitable method can be selected. Examples thereof include applying the adhesive to the cera-glass to which the glass primer has been applied using a gun or the like.

A method for adhering the cera-glass to which the adhesive has been applied to the adherend is not particularly limited. For example, the cera-glass to which the adhesive has been applied can be adhered to a predetermined position on the adherend, and cured by drying the adhesive.

With the method for adhering glass of this embodiment described above, the ceramic printed glass is cleaned using the first solution containing the DBSA, the PTSA, and the solvent prior to cleaning with the second solution containing the alkoxysilane compound. Thereby, it is possible to enhance the cleansing power of ceramic printed glass used for the front glass of automobiles. Particularly, even in cases where the ceramic printed glass is paper-scorched, cleansing power can be enhanced by the method for adhering glass of the present technology. As a result, the adhesive strength of the glass to the adherend after cleaning can be enhanced. Note that, the method for adhering glass of this embodiment is not particularly limited to applications in which the adherend to which the cera-glass is adhered to is an automobile body, and can be applied to applications in which cera-glass is adhered to boats and ships, aircraft, buildings, and the like.

Examples

The present technology is explained in further detail below by means of examples, but is in no way limited to these examples.

Fabrication of Hand Peeling Test Samples

Three types of cera-glass (cera-glass A, B, and C) described below were each cleaned using a first solution (cleaning agent 1) and a second solution (cleaning agent 2) subsequently. After the cleaning, a glass primer was applied to each cera-glass, and then an adhesive was applied. Thereafter, the adhesive was pressed to a thickness of 3 mm and cured. Thus, hand peeling test samples were obtained. The adhesive of hand peeling test samples for use in a low temperature adhesive strength test was cured at 5° C. for 10 days. The adhesive of hand peeling test samples for use in a hot water resistance adhesive strength test was cured at 20° C. for 7 days. Thereafter, each cera-glass was immersed in hot water having a temperature of 40° C. for 2 weeks.

Cera-glass A: Regular glass

Cera-glass B: Regular glass intentionally paper scorched by contact bonding paper thereto for 4 weeks Cera-glass C: Regular glass to which a silicone rubber is contact bonded for 1 week, followed by intentional paper scorching for 4 weeks The cleaning agent 1 contains dodecylbenzenesulfonic acid (DBSA) and p-toluenesulfonic acid (PTSA) at amounts shown in Table 1 per 100 mass % of isopropyl alcohol (IPA) in the cleaning agent 1. Units of the DBSA and the PTSA shown in Table 1 are mass percentages (mass %).

The cleaning agent 2 is a mixture containing 3 mass % of dimethylphenyl methoxysilane, 10 mass % of N-2-(aminoethyl)3-aminopropyltrimethoxysilane, and 87 mass % of a solvent. The solvent is a mixture containing 7 mass % of methanol and 80 mass % of isopropyl alcohol. Note that in Working Example 6, N-phenyl-3-aminopropyltrimethoxysilane is used in place of the dimethylphenyl methoxysilane as a component containing an NH group, and in Working Example 7, 3-mercaptopropylmethyldimethoxysilane is used as a component containing an SH group.

Hamatite® G (MS-90; manufactured by The Yokohama Rubber Co., Ltd.) was used as the glass primer, and Hamatite® WS-222 (manufactured by The Yokohama Rubber Co., Ltd.) was used as the adhesive.

The components shown in Table 1 are as follows.

N-2-(aminoethyl)3-aminopropyltrimethoxysilane: A-1110 (trade name; manufactured by Nippon Unicar Company Limited)

Component containing NH group used in Working Example 6 (N-phenyl-3-aminopropyltrimethoxysilane): KBM-573 (trade name; manufactured by Shin-Etsu Chemical Co., Ltd.)

Component containing SH group used in Working Example 7 (3-mercaptopropylmethyldimethoxysilane): KBM-802 (trade name; manufactured by Shin-Etsu Chemical Co., Ltd.)

Evaluation

The following three criteria were evaluated and the results thereof were recorded in Table 1: Adhesive strength of the adhesive cured on the cera-glass;

Presence of stickiness and powdery oxidation coating on the glass surface; and Presence of traces of wetting by the cleaning agents 1 and 2.

Criterion 1: Adhesive Strength

Each of the hand peeling test samples was peeled by hand while cutting using a knife.

In Table 1, the symbols "○" and "×" indicate the following states.

○: Complete cohesive failure of the adhesive occurred

×: Complete cohesive failure of the adhesive did not occur, rather, interfacial failure occurred Criterion 2: Presence of Stickiness and Powdery Oxidation Coating on the Glass Surface After cleaning using the cleaning agent 1, touch and visual evaluations of the presence of stickiness and/or powdery oxidation coating on the glass surface were performed. The results were recorded in Table 1.

Criterion 3: Presence of Traces of Wetting by the Cleaning Agents 1 and 2

After cleaning using the cleaning agent 2, a visual evaluation of the presence of traces of wetting by the cleaning agents 1 and 2 was performed. The results were recorded in Table 1.

TABLE 1

|  |  | W.E. 1 | W.E. 2 | W.E. 3 | W.E. 4 | W.E. 5 | W.E. 6 | W.E. 7 |
|---|---|---|---|---|---|---|---|---|
| Isopropyl alcohol (IPA) | | — | — | — | — | — | — | — |
| Cleaning agent 1 | Isopropyl alcohol (IPA) | 100 | 100 | 100 | 100 | 100 | 100 | 100 |
| | Dodecylbenzenesulfonic acid (DBSA) | 0.1 | 1 | 2 | 5 | 10 | 1 | 1 |
| | P-toluenesulfonic acid (PTSA) | 0.01 | 0.01 | 0.01 | 0.01 | 0.01 | 0.01 | 0.01 |
| Cleaning agent 2 | Dimethylphenyl methoxysilane | 3 | 3 | 3 | 3 | 3 | | |
| | N-2-(aminoethyl)3-aminopropyltrimethoxysilane | 10 | 10 | 10 | 10 | 10 | 10 | 10 |
| | N-phenyl-3-aminopropyltrimethoxysilane | | | | | | 3 | |
| | 3-mercaptopropylmethyl-dimethoxysilane | | | | | | | 3 |
| | Solvent | 87 | 87 | 87 | 87 | 87 | 87 | 87 |
| Criterion 1 | Cera-glass A / Low temperature adhesive strength test | ○ | ○ | ○ | ○ | ○ | ○ | ○ |
| | Cera-glass A / Hot water resistance adhesive strength test | ○ | ○ | ○ | ○ | ○ | ○ | ○ |
| | Cera-glass B / Low temperature adhesive strength test | ○ | ○ | ○ | ○ | ○ | ○ | ○ |
| | Cera-glass B / Hot water resistance adhesive strength test | ○ | ○ | ○ | ○ | ○ | ○ | ○ |
| | Cera-glass C / Low temperature adhesive strength test | ○ | ○ | ○ | ○ | ○ | ○ | ○ |
| | Cera-glass C / Hot water resistance adhesive strength test | ○ | ○ | ○ | ○ | ○ | ○ | ○ |
| Criterion 2 | Presence of stickiness and/or powdery oxidation coating on the glass surface | Absent | Absent | Absent | Absent | Absent | Absent | Absent |
| Criterion 3 | Presence of traces of wetting by the cleaning agents 1 and 2 | Absent | Absent | Absent | Absent | Absent | Absent | Absent |

|  |  | C.E. 1 | C.E. 2 | C.E. 3 | C.E. 4 | C.E. 5 | C.E. 6 |
|---|---|---|---|---|---|---|---|
| Isopropyl alcohol (IPA) | | Yes | — | — | — | — | — |
| Cleaning agent 1 | Isopropyl alcohol (IPA) | 100 | 100 | 100 | 100 | 100 | 100 |
| | Dodecylbenzenesulfonic acid (DBSA) | — | — | 0.01 | 0.1 | 2 | 15 |
| | P-toluenesulfonic acid (PTSA) | — | — | — | 0.01 | 10 | 0.01 |
| Cleaning agent 2 | Dimethylphenyl methoxysilane | 3 | 3 | 3 | 3 | 3 | 3 |
| | N-2-(aminoethyl)3-aminopropyltrimethoxysilane | 10 | 10 | 10 | 10 | 10 | 10 |
| | N-phenyl-3-aminopropyltrimethoxysilane | | | | | | |
| | 3-mercaptopropylmethyl-dimethoxysilane | | | | | | |
| | Solvent | 87 | 87 | 87 | 87 | 87 | 87 |
| Criterion 1 | Cera-glass A / Low temperature adhesive strength test | ○ | ○ | ○ | ○ | ○ | ○ |
| | Cera-glass A / Hot water resistance adhesive strength test | ○ | ○ | ○ | ○ | ○ | ○ |
| | Cera-glass B / Low temperature adhesive strength test | x | ○ | ○ | x | ○ | ○ |
| | Cera-glass B / Hot water resistance adhesive strength test | x | ○ | ○ | x | x | ○ |
| | Cera-glass C / Low temperature adhesive strength test | x | x | x | ○ | ○ | ○ |
| | Cera-glass C / Hot water resistance adhesive strength test | x | x | ○ | ○ | x | ○ |

TABLE 1-continued

| Criterion 2 | Presence of stickiness and/or powdery oxidation coating on the glass surface | Absent | Absent | Absent | Absent | Powdery oxidation coating present | Stickiness present |
|---|---|---|---|---|---|---|---|
| Criterion 3 | Presence of traces of wetting by the cleaning agents 1 and 2 | Absent | Present | Present | Absent | Present | Present |

In Table 1, "W.E." is an abbreviation for "Working Example"; and "C.E." is an abbreviation for "Comparative Example."

Evaluation Results

In the methods for adhering of Working Examples 1 to 7, washing was performed using a solution containing DBSA, PTSA, and IPA within a ratio described in the present technology (not less than 0.1 mass % and not more than 10 mass % of DBSA, and not less than 0.01 mass % and not more than 5 mass % of PTSA per 100 mass % of IPA) as the cleaning agent 1 and, thereafter washing was performed using a solution containing an alkoxysilane compound as the cleaning agent 2. As is clear from Table 1, in each of these Working Examples, complete cohesive failure of the adhesive and enhanced adhesive strength were confirmed in the low temperature adhesive strength test (Criterion 1). Additionally, in each of the methods for adhering of Working Examples 1 to 7, excellent results were confirmed for the evaluations of the presence of stickiness and/or powdery oxidation coating on the glass surface (Criterion 2) and the presence of traces of wetting by the cleaning agents 1 and 2 (Criterion 3).

In contrast, in Comparative Examples 1 to 6, washing using a solution containing DBSA, PTSA, and IPA within the ratio described in the present technology as the cleaning agent 1 and washing using a solution containing an alkoxysilane compound as the cleaning agent 2 was not performed subsequently. As a result, in each of Comparative Examples 1 to 4, complete cohesive failure of the adhesive was not confirmed in at least one of the cera-glasses B and C. Additionally, in Comparative Example 5, the content of the PTSA exceeded 5 mass % and, as a result, a powdery oxidation coating formed on the glass surface. Furthermore, in Comparative Example 6, the content of the DBSA exceeded 10 mass % and, as a result, the glass surface was found to be sticky.

As described above, the method for adhering glass of the present technology is useful in enhancing adhesive strength to an adherend.

What is claimed is:

1. A method for adhering glass comprising:
    a first cleaning step wherein ceramic printed glass is cleaned using a first solution comprising dodecylbenzenesulfonic acid, p-toluenesulfonic acid, and a solvent;
    a second cleaning step wherein the ceramic printed glass cleaned using the first solution is cleaned using a second solution comprising an alkoxysilane compound and a second solvent;
    a glass primer application step wherein a glass primer is applied to the ceramic printed glass cleaned using the first solution and the second solution; and
    a glass adhering step wherein an adhesive is applied to the ceramic printed glass after the glass primer has been applied, and the ceramic printed glass to which the adhesive has been applied is adhered to an adherend;
    wherein
    the first solution includes not less than 0.1 mass % and not more than 10 mass % of the dodecylbenzenesulfonic acid, and not less than 0.01 mass % and not more than 5 mass % of the p-toluenesulfonic acid, per 100 mass % of the solvent, and
    wherein the solvent of the first solution and the second solvent each include isopropyl alcohol.

2. The method for adhering glass according to claim 1, wherein the alkoxysilane compound comprises at least one of an imino group, an amino group, and a mercapto group.

3. The method for adhering glass according to claim 1, wherein the alkoxysilane compound is dimethylphenyl methoxysilane.

4. The method for adhering glass according to claim 1, wherein the first solution comprises an alkyl aromatic sulfonic acid and a sulfonic acid that contains a functional group other than a sulfo group.

5. The method for adhering glass according to claim 1, wherein the first solution comprises water.

6. The method for adhering glass according to claim 1, wherein the first solution includes not less than 0.5 mass % and not more than 1.5 mass % of the dodecylbenzenesulfonic acid per 100 mass % of the solvent.

7. The method for adhering glass according to claim 1, wherein the first solution includes not less than 0.1 mass % and not more than 0.7 mass % of the p-toluenesulfonic acid per 100 mass % of the solvent.

8. The method for adhering glass according to claim 1, wherein the first solution comprises one or more additives selected from the group consisting of polyisocyanate compounds, silane coupling agents, catalysts, resins, fillers, colorants, and drying agents; wherein the polyisocyanate compounds have an isocyanate group at an end thereof.

9. The method for adhering glass according to claim 1, wherein the first cleaning step comprises at least one of immersing the ceramic printed glass in the first solution, dripping the first solution on the ceramic printed glass using a dropper, and wiping the surface of the ceramic printed glass with gauze.

10. The method for adhering glass according to claim 1, wherein the second solution comprises a surface treating agent in addition to the alkoxysilane compound, the surface treating agent comprising at least one of a cationic, anionic, and nonionic surfactant.

11. The method for adhering glass according to claim 1, wherein a content of the alkoxysilane compound in the second solution is not less than 0.1 mass % and not more than 3 mass %.

12. The method for adhering glass according to claim 1, wherein the second solution further comprises a glycol additive.

13. The method for adhering glass according to claim 1, wherein the second solution further comprises a methanol or ethanol solvent.

14. The method for adhering glass according to claim 1, wherein the second solution further comprises a metal anti-corrosive and a colorant.

15. The method for adhering glass according to claim 1, wherein the second solvent and the solvent in the first solution each further comprise methyl ethyl ketone.

16. The method for adhering glass according to claim 1, wherein the second cleaning step comprises at least one of immersing the ceramic printed glass in the second solution, dripping the second solution on the ceramic printed glass using a dropper, brush application, and wiping the surface of the ceramic printed glass with gauze.

17. The method for adhering glass according to claim 1, wherein the glass primer comprises an isocyanate compound compounded in a silane-modified acrylic resin, wherein the silane-modified acrylic resin is:
- an acrylic resin modified by silane wherein a silicone bond has been introduced into the backbone of the acrylic resin; or
- a resin wherein the acrylic backbone is modified by an alkoxysilane Si(OR)n.

18. The method for adhering glass according to claim 1, wherein the glass primer application step comprises at least one of applying the glass primer to the ceramic printed glass using a brush, and applying by spraying.

19. The method for adhering glass according to claim 1, wherein the adhesive is a urethane-based adhesive.

20. The method for adhering glass according to claim 1, wherein the glass adhering step comprises applying the adhesive to the ceramic printed glass to which the glass primer has been applied using a gun.

* * * * *